US010819742B2

United States Patent
Ogawa et al.

(10) Patent No.: US 10,819,742 B2
(45) Date of Patent: *Oct. 27, 2020

(54) INTEGRATED INDUSTRIAL SYSTEM AND CONTROL METHOD THEREOF

(71) Applicant: YOKOGAWA ELECTRIC CORPORATION, Tokyo (JP)

(72) Inventors: Toshiki Ogawa, Tokyo (JP); Kazuya Suzuki, Tokyo (JP); Yasuhiko Yamashiro, Tokyo (JP); Sho Fujita, Tokyo (JP); Kenji Hasegawa, Tokyo (JP); Taro Kemmotsu, Tokyo (JP); Yuichiro Kadowaki, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 324 days.

This patent is subject to a terminal disclaimer.

(21) Appl. No.: 15/373,601

(22) Filed: Dec. 9, 2016

(65) Prior Publication Data

US 2017/0171243 A1    Jun. 15, 2017

(30) Foreign Application Priority Data

Dec. 15, 2015  (JP) .................................. 2015-244221

(51) Int. Cl.
*H04L 29/06* (2006.01)
*H04L 29/08* (2006.01)
(Continued)

(52) U.S. Cl.
CPC ........ *H04L 63/1466* (2013.01); *G05B 19/048* (2013.01); *G05B 19/0428* (2013.01);
(Continued)

(58) Field of Classification Search
CPC ..... H04L 63/1466; H04L 63/02; H04L 67/12; H04L 63/14–1441; G05B 149/048;
(Continued)

(56) References Cited

U.S. PATENT DOCUMENTS 7,185,366 B2    2/2007  Mukai
7,467,018 B1   12/2008  Callaghan
(Continued)

FOREIGN PATENT DOCUMENTS

DE    10 2005 063052 A1    7/2007
EP            2775685 A1    9/2014
(Continued)

OTHER PUBLICATIONS

Non-Final Rejection dated Jan. 9, 2019, which issued during the prosecution of U.S. Appl. No. 15/373,638.
(Continued)

*Primary Examiner* — Matthew T Henning
(74) *Attorney, Agent, or Firm* — Sughrue Mion, PLLC (57) ABSTRACT

An integrated industrial system includes a safety instrumented system which is installed in a first zone, a host system which is connected to the safety instrumented system through a network, the host system being installed in a second zone which is different from the first zone, a detector which is installed in each of the first zone and the second zone, the detector being configured to detect a cyber-attack from outside to a self-zone, and a defender configured to perform a countermeasure of restricting a communication between the first zone and the second zone or of restricting a communication in the first zone or the second zone, based on a detection result of the detector.

20 Claims, 8 Drawing Sheets

(51) Int. Cl.
  *G05B 19/042* (2006.01)
  *G05B 19/048* (2006.01)
(52) U.S. Cl.
  CPC .............. *H04L 63/02* (2013.01); *H04L 63/14* (2013.01); *H04L 67/10* (2013.01); *H04L 67/12* (2013.01); *G05B 2219/23317* (2013.01)
(58) Field of Classification Search
  CPC ...... G05B 149/418; G05B 2219/23317; G05B 19/048; G05B 19/0425; G05B 19/0428
  See application file for complete search history.

(56) References Cited

U.S. PATENT DOCUMENTS

| | | |
|---|---|---|
| 7,966,659 B1 | 6/2011 | Wilkinson et al. |
| 8,779,921 B1* | 7/2014 | Curtiss ................. G08B 25/009 340/506 |
| 8,881,288 B1 | 11/2014 | Levy et al. |
| 9,009,084 B2 | 4/2015 | Brandt et al. |
| 9,648,029 B2 | 5/2017 | Cheng |
| 9,836,990 B2 | 12/2017 | Nguyen et al. |
| 9,892,261 B2 | 2/2018 | Joram |
| 10,021,125 B2 | 7/2018 | Talamanchi et al. |
| 10,026,049 B2 | 7/2018 | Asenjo et al. |
| 10,078,317 B2 | 9/2018 | Houmb |
| 10,146,936 B1 | 12/2018 | Khanduja |
| 2003/0188197 A1 | 10/2003 | Miyata et al. |
| 2005/0005017 A1* | 1/2005 | Ptacek ................. H04L 63/029 709/229 |
| 2005/0050346 A1 | 3/2005 | Felactu et al. |
| 2005/0273184 A1 | 12/2005 | Dauss et al. |
| 2006/0026682 A1 | 2/2006 | Zakas |
| 2006/0031938 A1 | 2/2006 | Choi |
| 2008/0016339 A1 | 1/2008 | Shukla |
| 2008/0125887 A1 | 5/2008 | Case |
| 2008/0162085 A1 | 7/2008 | Clayton et al. |
| 2009/0089325 A1 | 4/2009 | Bradfor et al. |
| 2010/0077471 A1 | 3/2010 | Schleiss et al. |
| 2010/0287608 A1 | 11/2010 | Khuti et al. |
| 2011/0067107 A1 | 3/2011 | Weeks et al. |
| 2011/0289588 A1 | 11/2011 | Sahai et al. |
| 2012/0151593 A1 | 6/2012 | Kang et al. |
| 2012/0209411 A1 | 8/2012 | Ohkado et al. |
| 2012/0284790 A1 | 11/2012 | Bhargava |
| 2012/0313755 A1* | 12/2012 | Gutierrez ............ G06F 16/9537 340/8.1 |
| 2013/0031037 A1 | 1/2013 | Brandt et al. |
| 2013/0081103 A1 | 3/2013 | Uner et al. |
| 2013/0091539 A1 | 4/2013 | Khurana et al. |
| 2013/0201192 A1 | 8/2013 | Kanda |
| 2013/0211555 A1 | 8/2013 | Lawsonet et al. |
| 2013/0211558 A1 | 8/2013 | Mishina |
| 2013/0212214 A1 | 8/2013 | Lawson et al. |
| 2013/0212669 A1 | 8/2013 | Wilson |
| 2013/0227689 A1 | 8/2013 | Pietrowicz et al. |
| 2013/0245793 A1 | 9/2013 | Akiyama et al. |
| 2013/0274898 A1 | 10/2013 | Thatikonda et al. |
| 2013/0312092 A1 | 11/2013 | Parker |
| 2014/0237599 A1 | 8/2014 | Gertner et al. |
| 2014/0237606 A1 | 8/2014 | Futoransky |
| 2014/0317737 A1 | 10/2014 | Shin et al. |
| 2015/0040228 A1 | 2/2015 | Lee et al. |
| 2015/0244734 A1 | 8/2015 | Olson et al. |
| 2015/0281278 A1 | 10/2015 | Gooding et al. |
| 2015/0295944 A1 | 10/2015 | Yunoki et al. |
| 2015/0301515 A1 | 10/2015 | Houmb |
| 2015/0381642 A1 | 12/2015 | Kim et al. |
| 2015/0381649 A1 | 12/2015 | Schultz et al. |
| 2016/0036838 A1 | 2/2016 | Jain et al. |
| 2016/0050225 A1 | 2/2016 | Carpenter et al. |
| 2016/0078694 A1 | 3/2016 | Swift |
| 2016/0094578 A1 | 3/2016 | McQuillan et al. |
| 2016/0112445 A1 | 4/2016 | Abramowitz |
| 2016/0234241 A1 | 8/2016 | Talamanchi et al. |
| 2016/0261482 A1 | 9/2016 | Mixer et al. |
| 2016/0337390 A1 | 11/2016 | Sridhara et al. |
| 2016/0344754 A1 | 11/2016 | Rayapeta et al. |
| 2016/0366174 A1 | 12/2016 | Chernin et al. |
| 2017/0126727 A1 | 5/2017 | Beam et al. |
| 2017/0353484 A1* | 12/2017 | Knapp .................... G06F 21/71 |
| 2018/0020014 A1 | 1/2018 | Kamiya et al. |
| 2018/0063244 A1 | 3/2018 | Maturana et al. |
| 2018/0096153 A1 | 4/2018 | DeWitte et al. |

FOREIGN PATENT DOCUMENTS

| | | |
|---|---|---|
| JP | 2000-267957 A | 9/2000 |
| JP | 2003-288282 A | 10/2003 |
| JP | 2010-081610 A | 4/2010 |
| JP | 2013-161432 A | 8/2013 |
| WO | 2015/001594 A1 | 1/2015 |
| WO | 2015/104691 A2 | 7/2015 |

OTHER PUBLICATIONS

Akira Wakabayashi, "Safety Instrumented System for Process Industry", Japan Industrial Publishing Co., Ltd., Oct. 1, 2013, vol. 41, pp. 46-51 (8 pages total).

Masashi Murakami, "To Build a Control System that is Strong against Cyber Attacks", Instrumentation Control Engineering, Japan, Kogyogijutsusha, Feb. 18, 2013, vol. 56, pp. 63-71 (13 pages total).

Shoichi Doi, "The Optimal Security Design for a Production Control System", Masahiro Miyauchi, Japan Technical Association of the Pulp and Paper Industry, Feb. 27, 2015, vol. 69, pp. 43-48 (9 pages total).

Karnouskos et al., "Architecting the next generation of service-based SCADA/DCS system of systems", IEEE, 2011, pp. 359-364.

Schuster et al., "A Distributed Intrusion Detection System for Industrial Automation Networks", IEEE, 2012, 4 pages total.

Briesemeister et al., "Detection, Correlation, and Visualization of Attacks Against Critical Infrastructure Systems", 2010 Eighth Annual International Conference on Privacy, Security and Trust, IEEE, 2010, pp. 15-22.

Jiang et al., "A Zone-Based Intrusion Detection System for Wireless Ad Hoc Distribution Power Communication Networks", 2005 IEEE/PES Transmission and Distribution Conference & Exhibition: Asia and Pacific, 2005, pp. 1-6.

Yang et al., "Multiattribute SCADA-Specific Intrusion Detection System for Power Networks", IEEE Transactions on Power Delivery, vol. 29, No. 3, Jun. 2014, pp. 1092-1102.

Zhu et al., "SCADA-specific Intrusion Detection/Prevention Systems: A Survey and Taxonomy", University of California at Berkley, Berkley, CA, 2010, 16 pages total.

Cheung et al., "Using Model-based Intrusion Detection for SCADA Networks", Computer Science Laboratory, SRI International, Dec. 7, 2006, pp. 1-12.

* cited by examiner

| ATTACK TARGET No. | COUNTERMEASURE No. | TARGET DEVICE |
|---|---|---|
| A1 | B1 | — |
| A2 | B3 | NE6<br>NE5 |
| A3 | B2 | HMI22<br>ENG23, 32 |
| A4 | B3 | NE6<br>NE5 |
| A5 | B4 | NE5<br>NE4 |
| A6 | B4 | NE5<br>NE4 |
| A7 | B4 | NE5<br>NE4 |
| A8 | B5 | NE3<br>NE2<br>NE1 |
| A9 | B2 | HMI22<br>ENG23, 32 |

FIG. 4A

| ATTACK TARGET No. | ZONE | DEVICE | LEVEL | TYPE |
|---|---|---|---|---|
| A1 | Z3 | FIREWALL | NETWORK | ALL WARNINGS |
| A2 | Z3 | FIREWALL | NETWORK | ALL ALARMS |
| A3 | Z3 | SWITCH | NETWORK | UNUSED LOGICAL PORT ACCESS DETECTION |
| A4 | Z3 | PC | ALL | VIRUS WORM |
| A5 | Z2 | FIREWALL SWITCH | NETWORK | ALL WARNINGS ALL ALARMS |
| A6 | Z2 | SWITCH | NETWORK | ALL WARNINGS ALL ALARMS |
| A7 | Z2 | PC CONTROLLER | ALL | ALL WARNINGS ALL ALARMS |
| A8 | Z1 | PC | ALL | ALL WARNINGS ALL ALARMS |
| A9 | Z1 | PC | HARDWARE | USB INSERTION DETECTION |

FIG. 4B

| COUNTERMEASURE No. | ACTION |
|---|---|
| B1 | RECORD IN EVENT LOG, AND DISPLAY ON MANAGEMENT SCREEN OF SYSTEM ADMINISTRATOR |
| B2 | RECORD IN EVENT LOG, AND DISPLAY ALARM ON HMI22 |
| B3 | DISCONNECT NETWORK PORT LOGICALLY |
| B4 | BLOCK NETWORK PHYSICALLY (SHUT DOWN NETWORK DEVICE BY UPS FUNCTION) |
| B5 | BLOCK NETWORK PHYSICALLY (BLOCK POWER SUPPLY BY CONTROLLING POWER SUPPLY TAP) |

| ATTACK TARGET No. | ZONE | DEVICE | LEVEL | TYPE |
|---|---|---|---|---|
| A11 | Z3 | ALL | ALL | ALL ALARMS |
| A12 | Z2 | ALL | ALL | ALL ALARMS |
| A13 | Z1 | ALL | ALL | ALL ALARMS |

FIG. 6B

| COUNTERMEASURE No. | ACTION |
|---|---|
| B11 | RECORD IN EVENT LOG, AND DISPLAY ON MANAGEMENT SCREEN OF SYSTEM ADMINISTRATOR |
| B12 | RECORD IN EVENT LOG, AND NOTIFY SYSTEM ADMINISTRATOR |
| B13 | RECORD IN EVENT LOG, AND DISPLAY ALARM ON HMI22 |

INTEGRATED INDUSTRIAL SYSTEM AND CONTROL METHOD THEREOF

BACKGROUND

Technical Fields

The disclosure relates to an integrated industrial system and a control method thereof.

Priority is claimed on Japanese Patent Application No. 2015-244221, filed Dec. 15, 2015, the contents of which are incorporated herein by reference.

Related Art

In a plant and a factory (hereinafter, called simply "plant" as a generic name of them), an integrated industrial system is established, and an advanced automatic operation is implemented. In order to secure safety and perform advanced control, the integrated industrial system includes a control system such as a distributed control system (DCS) and a safety system such as a safety instrumented system (SIS). The distributed control system is a process control system which controls industrial process implemented in the plant.

In the distributed control system, field devices (for example, a measurement device and an actuation device) and a controller which controls these field devices are connected to each other through communication means. The controller collects measurement data measured by a field device, and operates (controls) a field device in accordance with the collected measurement data. Thereby, the distributed control system controls various kinds of state quantity in the industrial process. In an emergency, the safety instrumented system certainly shuts down the plant in a safe state. Thereby, the safety instrumented system prevents a physical injury and an environmental pollution, and protects expensive facilities. When an abnormal circumstance occurs in the plant, the safety instrumented system plays a role of "stronghold for securing safety".

There is a possibility that the integrated industrial system receives cyber-attacks from outside. For this reason, in the integrated industrial system, countermeasures (security countermeasures) for a case that each of the distributed control system and the safety instrumented system receives cyber-attacks, or for a case that the whole integrated industrial system receives cyber-attacks, are prepared. For example, a firewall for preventing intrusion from outside to the integrated industrial system is prepared, or antivirus software (software which detects virus infection and removes virus) is installed in a computer. The controller which is a core of the distributed control system and the safety instrumented system has a high resistance against cyber-attacks by using an original operating system.

The integrated industrial system is sectioned into two or more zones, and the security countermeasures are basically applied to each zone. For example, an integrated industrial system established in conformity with hierarchical structures specified by International Standard ISA-95 (IEC/ISO 62264) is sectioned into two or more zones on the basis of hierarchy. The security countermeasures are applied to each hierarchy. For example, a conventional technology for maintaining security of a control network is disclosed in Japanese Unexamined Patent Application Publication No. 2000-267957 and Japanese Unexamined Patent Application Publication No. 2010-081610. A conventional technology for displaying a tree view in accordance with hierarchical structure of International Standard ISA-95 is disclosed in Japanese Unexamined Patent Application Publication No. 2013-161432.

By the way, as described above, since the security countermeasures against cyber-attacks from the outside are basically applied to each zone, the security countermeasures are individually performed in each zone when cyber-attacks are performed. For this reason, in the conventional integrated industrial system, if the security countermeasures of each zone are not enough with respect to cyber-attacks, the cyber-attacks reach the zone where the safety instrumented system belongs. For this reason, there is a problem that final defense countermeasures depend on security countermeasures applied to the zone where the safety instrumented system belongs.

The safety instrumented system does not usually communicate with a host system, but the safety instrumented system communicates with the distributed control system. On the other hand, the distributed control system is supposed to communicate with the host system. As a result, since the safety instrumented system is connected to the host system, there is a problem that cyber-attacks may reach the zone where the safety instrumented system belongs.

As described above, if the security countermeasures of each zone are not enough with respect to cyber-attacks, cyber-attacks reach the zone where the safety instrumented system belongs. For this reason, a control right of the safety instrumented system (or an engineering station which creates program to be used by the safety instrumented system) may be deprived. If such a situation occurs and programs of the controller which is a core of the safety instrumented system are rewritten, a role of "stronghold for securing safety" is lost. Therefore, it is necessary not to raise the above-described situation.

SUMMARY

An integrated industrial system may include a safety instrumented system which is installed in a first zone, a host system which is connected to the safety instrumented system through a network, the host system being installed in a second zone which is different from the first zone, a detector which is installed in each of the first zone and the second zone, the detector being configured to detect a cyber-attack from outside to a self-zone, and a defender configured to perform a countermeasure of restricting a communication between the first zone and the second zone or of restricting a communication in the first zone or the second zone, based on a detection result of the detector.

Further features and aspects of the present disclosure will become apparent from the following detailed description of exemplary embodiments with reference to the attached drawings.

DETAILED DESCRIPTION OF THE EMBODIMENTS

The embodiments of the present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

An aspect of the present invention is to provide an integrated industrial system and a control method thereof which can defend against cyber-attacks to a safety instrumented system beforehand, and can secure a normality of the safety instrumented system.

Hereinafter, an integrated industrial system and a control method thereof of embodiments will be described in detail, with reference to drawings.

First Embodiment

Figure 1:
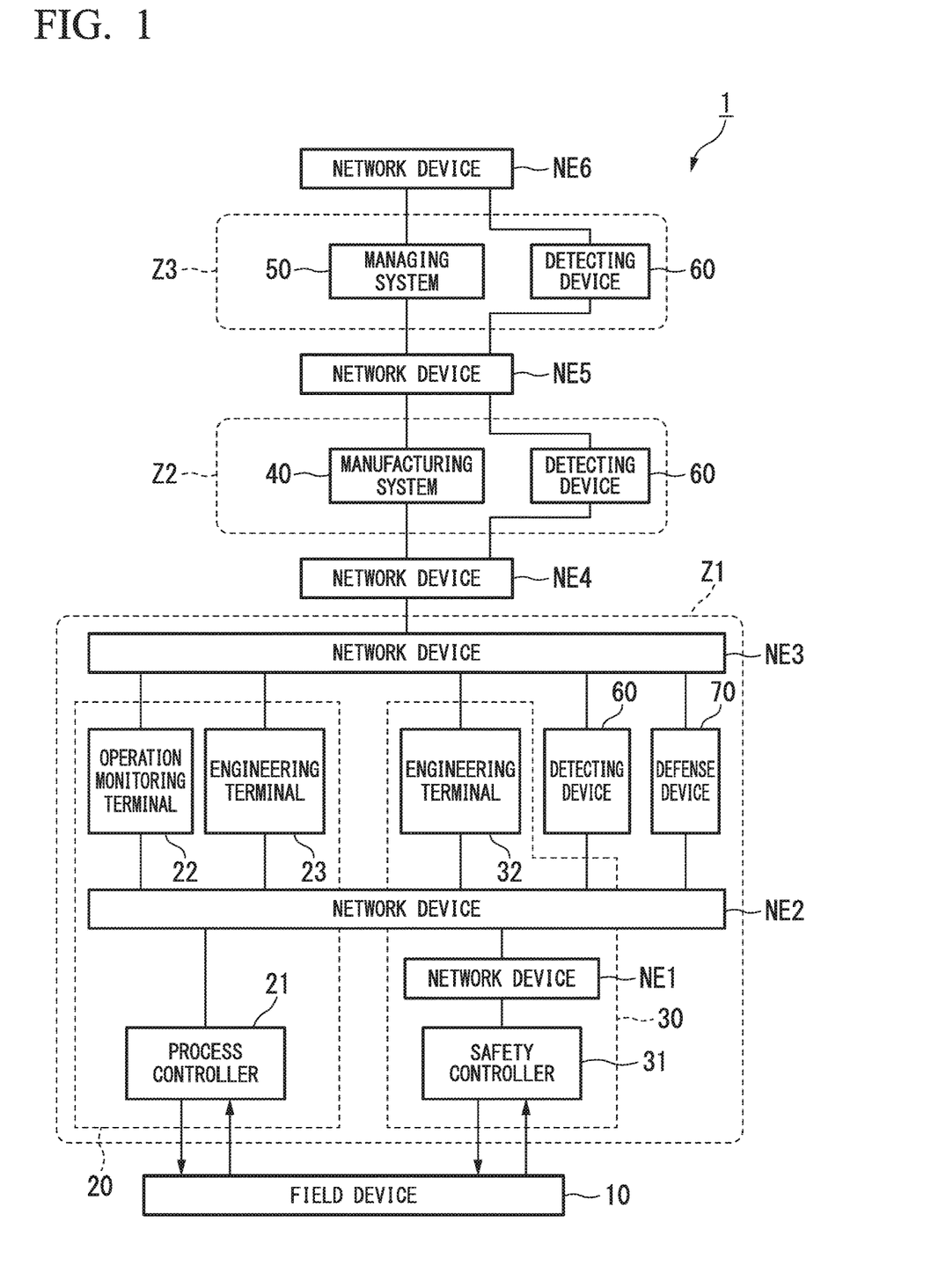
FIG. 1 is a block diagram illustrating a whole configuration of the integrated industrial system in the first embodiment of the present invention.

FIG. 1 is a block diagram illustrating a whole configuration of the integrated industrial system in the first embodiment of the present invention. As shown in FIG. 1, the integrated industrial system 1 of the present embodiment includes a field device 10, a distributed control system (DCS) 20, a safety instrumented system (SIS) 30, a manufacturing system 40 (a host system; a first system), a managing system 50 (a host system; a second system), a detecting device 60 (detector), and a defense device 70 (defender). The integrated industrial system 1 performs automatic operation of a plant, and performs maintenance management of the plant.

The integrated industrial system 1 is established in conformity with hierarchical structures specified by International Standard ISA-95 (IEC/ISO 62264). Specifically, in the integrated industrial system 1, the distributed control system 20 and the safety instrumented system 30 belong to a hierarchy of level 2, the manufacturing system 40 belongs to a hierarchy of level 3, and the managing system 50 belongs to a hierarchy of level 4. The distributed control system 20, the safety instrumented system 30, the manufacturing system 40, the managing system 50, the detecting device 60, and the defense device 70 are connected to each other through a network configured by network devices NE1 to NE6.

The integrated industrial system 1 is sectioned into two or more zones on the basis of hierarchy in order to prepare security countermeasures. Specifically, in the integrated industrial system 1, the distributed control system 20 and the safety instrumented system 30 are installed in a zone Z1, the manufacturing system 40 is installed in a zone Z2, and the managing system 50 is installed in a zone Z3.

The plant includes an industrial plant such as a chemical industrial plant, a plant managing and controlling a wellhead (for example, a gas field and an oil field), a plant managing and controlling a generation of electric power (for example, hydro power, thermal power, and nuclear power), a plant managing and controlling a power harvesting (for example, solar power and wind power), a plant managing and controlling water supply and sewerage systems, a dam, and so on.

The field device 10 is installed at a field of the plant, and the field device performs measurement and actuation required for control of industrial process under control of the distributed control system 20. Specifically, the field device 10 is such as a sensor device (for example, a pressure meter, a flowmeter, a temperature sensor, a gas sensor, and a vibration sensor), a valve device (for example, a flow control valve and an on-off valve), an actuator device (for example, a fan and a motor), an imaging device (for example, a camera and a video camera recording circumstances and objects in the plant), a sound device (for example, a microphone collecting abnormal noise in the plant, and a speaker generating alarm sound), a position detection device outputting position information of the each device, and other devices.

The field device 10 communicates with the distributed control system 20 or the safety instrumented system 30. For example, the field device 10 performs wired communication through a network or a communication bus (not shown), or wireless communication in conformity with industrial wireless communication standards, such as ISA100.11a and WirelessHART (registered trademark), with respect to the distributed control system 20 and the safety instrumented system 30.

The distributed control system 20 is equipped with a process controller 21, an operation monitoring terminal 22, and an engineering terminal 23. The distributed control system 20 collects measurement data measured by the field device 10, and operates (controls) the field device 10 in accordance with the collected measurement data, in order to control various kinds of state quantity. The state quantity controlled by the distributed control system 20 is various kinds of state quantity in the industrial process. For example, the state quantity is pressure, temperature, flow quantity, or the like.

The process controller 21 is a core of the distributed control system 20. The process controller 21 collects the measurement data from the field device 10, and operates (controls) the field device 10. For example, the operation monitoring terminal 22 is operated by a plant operator, and the operation monitoring terminal 22 is used for monitoring an operational status of the plant. The engineering terminal 23 is a terminal used for creating programs to be executed by the process controller 21. The process controller 21, the operation monitoring terminal 22, and the engineering terminal 23 are connected to each other through the network device NE2. For example, if it is not necessary to create the programs to be executed by the process controller 21, the engineering terminal 23 may be omitted, or the engineering terminal 23 does not need to be always connected to the network.

The safety instrumented system 30 is equipped with a safety controller 31 and an engineering terminal 32. In an emergency, the safety instrumented system 30 certainly shuts down the plant in a safe state, in order to prevent a physical injury and an environmental pollution, and protect expensive facilities. When an abnormal circumstance occurs in the plant, the safety instrumented system plays a role of "stronghold for securing safety".

The safety controller 31 is a core of the safety instrumented system 30. The safety controller 31 communicates with the field device 10 or another safety controller (not shown) and obtains necessary data, in order to determine whether an abnormal circumstance occurs in the plant or not. If the safety controller 31 determines that an abnormal circumstance occurs in the plant, the safety controller 31 executes a safety control logic for implementing safety control. The engineering terminal 32 is a terminal used for creating programs to be executed by the safety controller 31. The safety controllers 31 and the engineering terminal 32 are connected to each other through the network devices NE1 and NE2. Similar to the engineering terminal 23, for example, if it is not necessary to create the programs to be executed by the safety controller 31, the engineering terminal 32 may be omitted, or the engineering terminal 32 is not always connected to the network.

The manufacturing system 40 is a system established for manufacturing products in the plant efficiently. The manufacturing system 40 is such as a Manufacturing Execution System (MES), a Plant Information Management System (PIMS), and a Plant Asset Management System (PAM). As the manufacturing system 40, only one of the Manufacturing Execution System, the Plant Information Management System, and the Plant Asset Management System may be established, and two or more of them may be established. The manufacturing system 40 is connected to the distributed control system 20 and the safety instrumented system 30 through the network devices NE3 and NE4.

The managing system 50 is a system established for business, such as management or sales and marketing in a company. For example, the managing system 50 is an Enterprise Resource Planning System (ERP). The managing system 50 is connected to the manufacturing system 40 through the network device NE5, and the managing system 50 is connected to other unillustrated networks (for example, Internet) through the network device NE6.

The detecting device 60 is installed in each of the zones Z1 to Z3. The detecting device 60 detects cyber-attacks from outside to the self-zone. The cyber-attacks from outside are such as an unauthorized invasion to the integrated industrial system 1, an alteration of the program used by the integrated industrial system 1, a fraud and a destruction of data used by the integrated industrial system 1, an act for making the integrated industrial system 1 be in malfunction state, and other acts.

The detecting device 60 is prepared in accordance with a design concept of each of the zones Z1 to Z3. For example, the detecting device 60 can utilize commercial antivirus software (software which detects virus infection and removes virus), or utilize an intrusion detection system. In the present embodiment, in order to understand easily, an example that the detecting device 60 is prepared as "device" will be described, but the function of the detecting device 60 may be implemented by software.

The detecting device 60 installed in each of the zones Z1 to Z3 is connected to the network configured by the network devices NE1 to NE6. If the detecting device 60 installed in each of the zones Z1 to Z3 detects cyber-attacks, the detecting device 60 transmits the detection result to the defense device 70 through the network. Specifically, the detecting device 60 installed in the zone Z1 is connected to the network devices NE2 and NE3. The detecting device 60 installed in the zone Z2 is connected to the network devices NE4 and NE5. The detecting device 60 installed in the zone Z3 is connected to the network device NE5 and NE6.

The network devices NE1 to NE6 are such as a firewall, a router, a switch, and so on. The network device NE4 is installed between the zone Z1 and the zone Z2. The network device NE5 is installed between the zone Z2 and the zone Z3. The network device NE6 is installed between the zone Z3 and another unillustrated network (for example, Internet). The network device NE1 is installed between the safety controller 31 and the network device N2.

The defense device 70 performs security countermeasures for defending against cyber-attacks from outside based on the detection result obtained from the detecting device 60. For example, the defense device 70 performs a countermeasure of restricting a communication between the zones Z1 to Z3, or a countermeasure of restricting a communication in the zone Z1. The defense device 70 is installed in the zone Z1 where the safety instrumented system 30 belongs. The defense device 70 obtains the detection result of the detecting device 60 through the network configured by the network devices NE1 to NE6, and the defense device 70 performs the security countermeasures through the network configured by the network devices NE1 to NE6.

Figure 2:
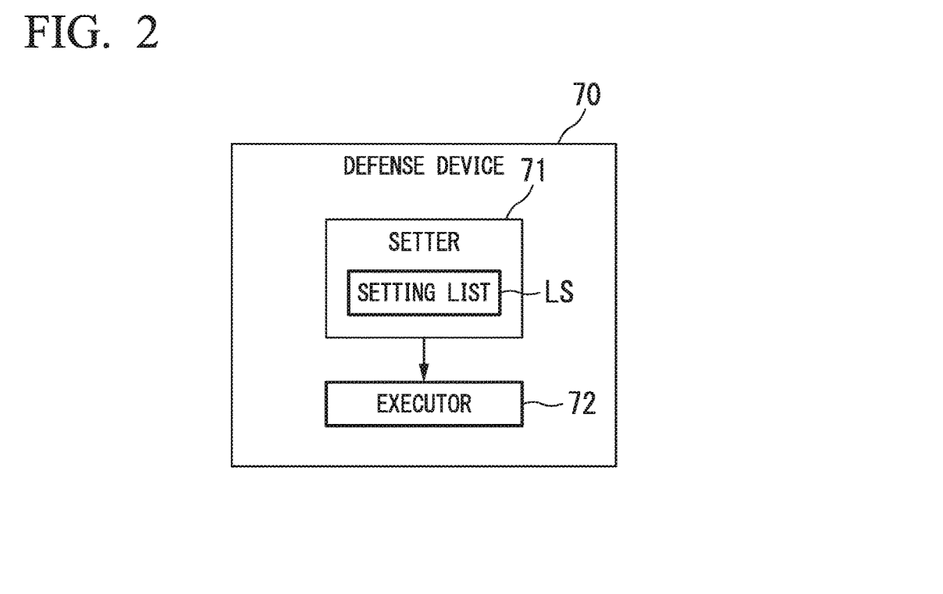
FIG. 2 is a block diagram illustrating a main configuration of the defense device in the first embodiment of the present invention.

FIG. 2 is a block diagram illustrating a main configuration of the defense device in the first embodiment of the present invention. As shown in FIG. 2, the defense device 70 is equipped with a setter 71 and an executor 72. The setter 71 specifies a target and a type of the cyber-attack based on the detection result of the detecting device 60, and the setter 71 sets security countermeasures in accordance with the specified contents. The setter 71 sets the security countermeasures by using a setting list LS in which an attack target list and a countermeasure list are associated with each other. The attack target list represents a list of the target and the type of the cyber-attack. The countermeasure list represents a list of security countermeasures which should be performed in accordance with the target and the type of the cyber-attack. The executor 72 executes security countermeasures which have been set by the setter 71. In the present embodiment, in order to understand easily, an example that the defense device 70 is prepared as "device" will be described. However, similar to the detecting device 60, the function of the defense device 70 may be implemented by software.

Figure 3:
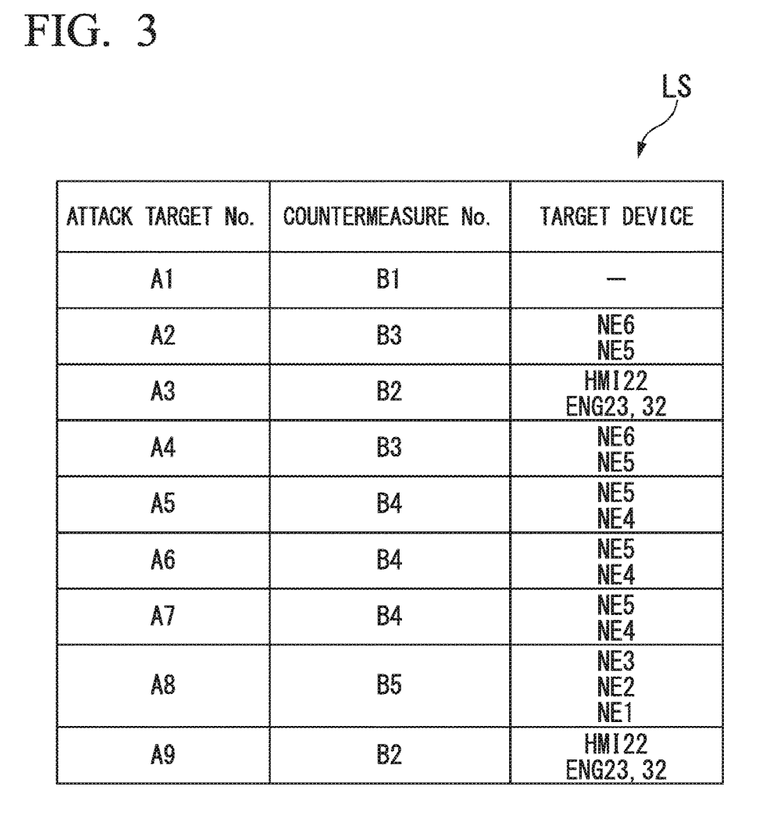
FIG. 3 is a drawing illustrating an example of the setting list in the first embodiment of the present invention.
Figure 4A:
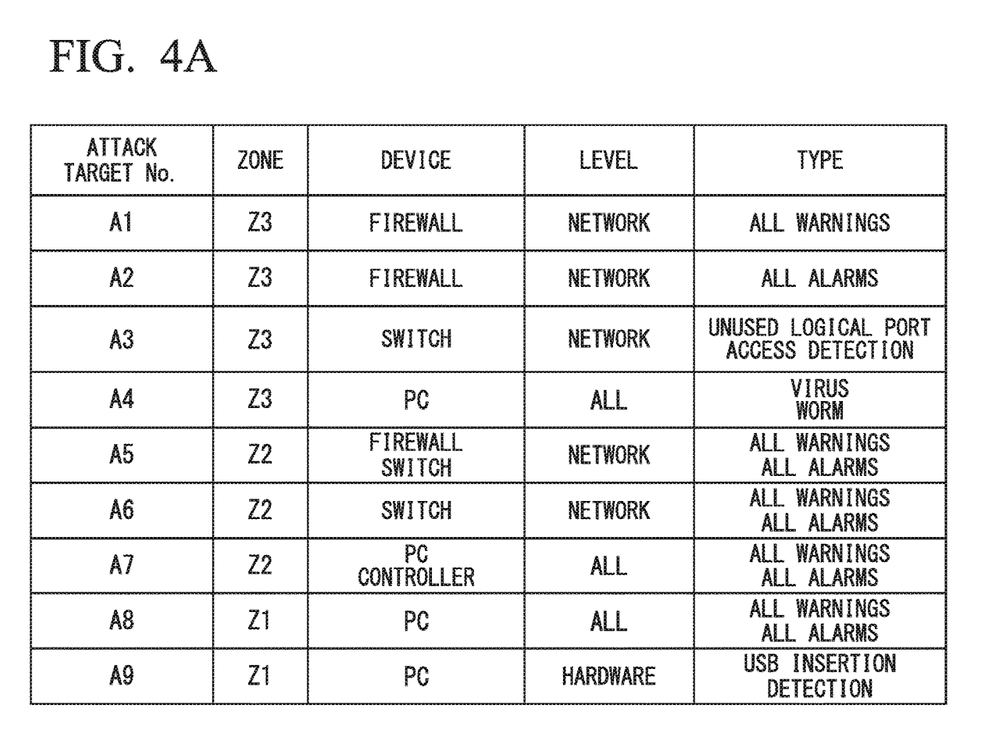
FIG. 4A is a drawing illustrating an example of the attack target list in the first embodiment of the present invention.
Figure 4B:
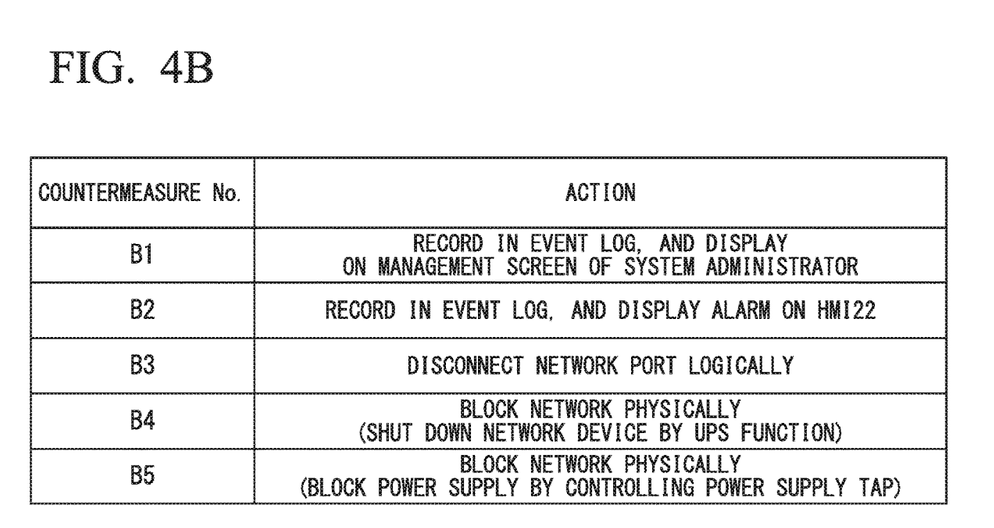
FIG. 4B is a drawing illustrating an example of the countermeasure list in the first embodiment of the present invention.

FIG. 3 is a drawing illustrating an example of the setting list in the first embodiment of the present invention. FIG. 4A is a drawing illustrating an attack target list. FIG. 4B is a drawing illustrating a countermeasure list. As shown in FIG. 3, FIG. 4A, and FIG. 4B, the setting list LS is a list in which "attack target number" (attack target No.) of the attack target list, "countermeasure number" (countermeasure No.) of the countermeasure list, and "target device" have been associated with each other. The "target device" is a target to which security countermeasures are to be performed.

As shown in FIG. 4A, the attack target list is a list in which "attack target number" (attack target No.), "zone", "device", "level", and "type" have been associated with each other. The attack target list is a list used for specifying what kind of attack has been made with respect to which zone. The "attack target number" is a number allocated for distinguishing various cyber-attacks performed to the integrated industrial system 1. The "zone" is information for specifying a zone to which the cyber-attack has been performed.

The "device" is information for specifying a device to which the cyber-attack has been performed. The "device" is such as a personal computer (PC), a controller, a switch, a firewall, and so on. The "level" is information for specifying which part of a device has been attacked with the cyber-attack. The "level" is such as an operating system (OS), a network, hardware, application, and so on. The "type" is information for specifying a type of the cyber-attack. The "type" is such as a virus, a DoS attack (Denial of Service attack), and so on.

As shown in FIG. 4B, a countermeasure list is a list in which "countermeasure number" (countermeasure No.) and "action" have been associated with each other. The "countermeasure number" is a number allocated for distinguishing various security countermeasures performed by the integrated industrial system 1. The "action" is information for specifying a security countermeasure which should be performed against the cyber-attack if the cyber-attack is performed. The "action" is such as disconnecting the network port logically, blocking the network physically, and so on.

For example, in a fourth line of the setting list LS shown in FIG. 3, an attack target number "A4", a countermeasure number "B3", and target devices "NE5, NE6" are associated with each other. Since the association has been made, if a PC which belongs to the zone Z3 has been infected with a virus by a cyber-attack, a security countermeasure of logically disconnecting the network port of the network devices NE5 and NE6 is to be performed.

For example, in an eighth line of the setting list LS shown in FIG. 3, an attack target number "A8", a countermeasure number "B5", and target devices "NE1, NE2, NE3" are associated with each other. Since the association has been made, if a PC which belongs to the zone Z1 has been attacked with a cyber-attack, a security countermeasure of blocking power supply of the network devices NE1, NE2, and NE3, and for physically blocking the network, is to be performed.

For example, in a ninth line of the setting list LS shown in FIG. 3, an attack target number "A9", a countermeasure number "B2", and target devices "HMI22, ENG 23 and 32" are associated with each other. Since the association has been made, if it has been detected that a USB (Universal Serial Bus) device has been inserted to a PC which belongs to the zone Z1, a countermeasure of recording the insertion of the USB device on event logs of the operation monitoring terminal (HMI) 22 and the engineering terminals (ENG) 23 and 32, and for displaying an alarm on the operation monitoring terminal (HMI) 22, is to be performed.

Figure 5:
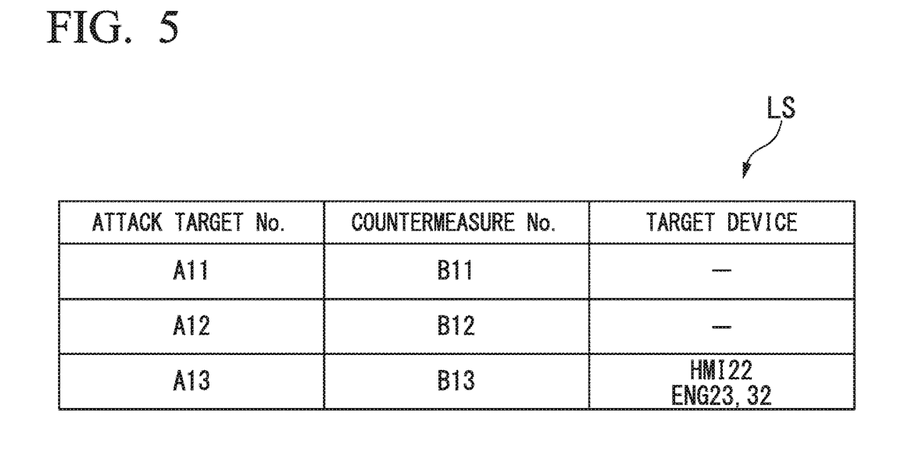
FIG. 5 is a drawing illustrating another example of the setting list in the first embodiment of the present invention.
Figure 6A:
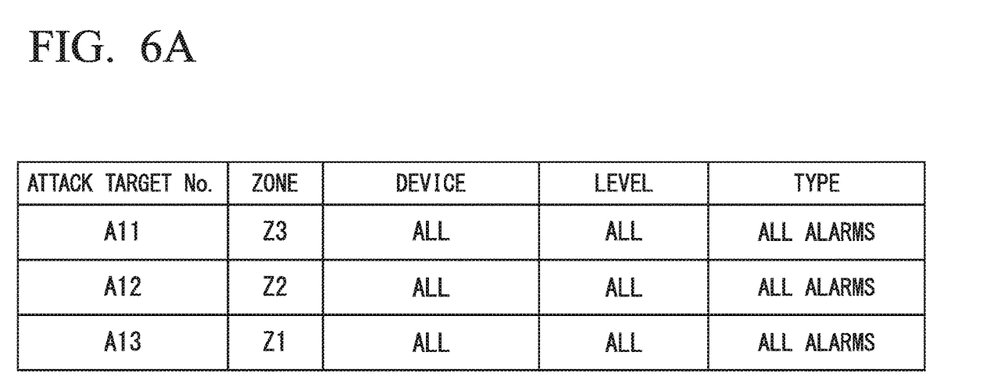
FIG. 6A is a drawing illustrating another example of the attack target list in the first embodiment of the present invention.
Figure 6B:
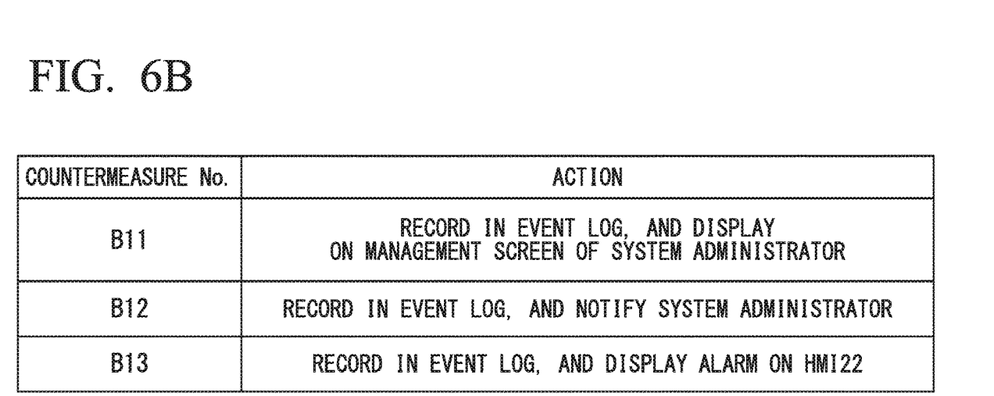
FIG. 6B is a drawing illustrating another example of the countermeasure list in the first embodiment of the present invention.

FIG. 5 is a drawing illustrating another example of the setting list in the first embodiment of the present invention. FIG. 6A is a drawing illustrating another example of the attack target list. FIG. 6B is a drawing illustrating another example of the countermeasure list. Unlike the lists shown in FIG. 3, FIG. 4A, and FIG. 4B, the setting list LS shown in FIG. 5, if a cyber-attack is detected, the attack target list shown in FIG. 6A, and the countermeasure list shown in FIG. 6B are used by an administrator for determining a countermeasure against the cyber-attack without disconnecting the network.

For example, in a third line of the setting list LS shown in FIG. 5, an attack target number "A13", a countermeasure number "B13", and target devices "HMI22, ENG 23 and 32" are associated with each other. Since the association has been made, if a cyber-attack to a PC which belongs to the zone Z1 is detected, a countermeasure of recording the cyber-attack on event logs of the operation monitoring terminal (HMI) 22 and the engineering terminals (ENG) 23 and 32, and for displaying an alarm on the operation monitoring terminal (HMI) 22, is to be performed.

Figure 7:
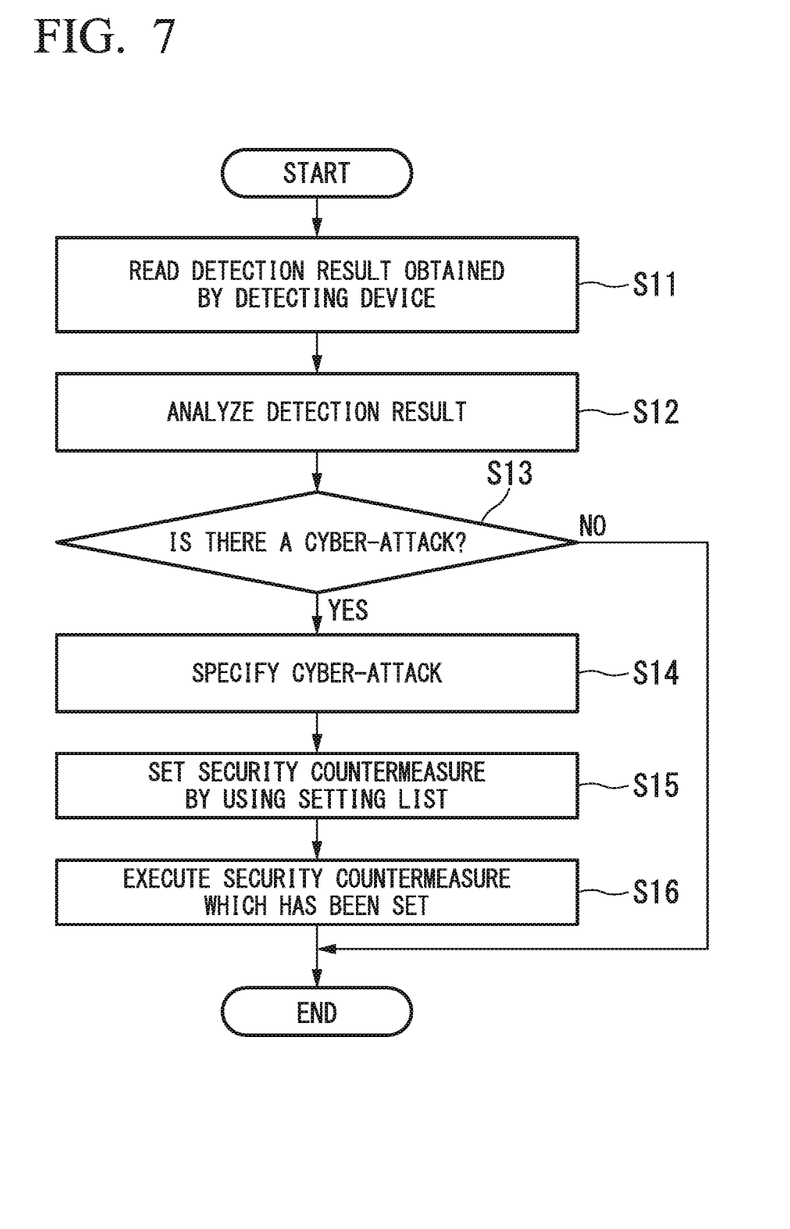
FIG. 7 is a flow chart illustrating an operation of the defense device in the first embodiment of the present invention.

Next, operations of the integrated industrial system 1 of the above-described configuration will be described. Although operations of the integrated industrial system 1 are various, operations mainly performed by the detecting device 60 and the defense device 70 (operations for detecting a cyber-attack and defending against it) will be described below. FIG. 7 is a flow chart illustrating an operation of the defense device in the first embodiment of the present invention. For example, processing of the flow chart shown in FIG. 7 is performed at a predetermined constant cycle.

If processing of the flow chart shown in FIG. 7 is started, first, the setter 71 (refer to FIG. 2) of the defense device 70 reads the detection result obtained from the detecting device 60 (Step S11), and the setter 71 analyzes the detection result (Step S12). Next, the setter 71 determines whether or not there is a cyber-attack to the integrated industrial system 1 based on a result of the analysis (Step S13). If the setter 71 has determined that there is no cyber-attack to the integrated industrial system 1 (Step S13: "NO"), the series of processing shown in FIG. 7 ends.

On the other hand, if the setter 71 has determined that there is a cyber-attack to the integrated industrial system 1 (Step S13: "YES"), the setter 71 specifies a target and a type of the cyber-attack based on the result of the analysis performed at Step S12 (Step S14). If the setter 71 has specified a target and a type of the cyber-attack, the setter 71 sets a security countermeasure in accordance with the specified contents by using the setting list LS (Step S15). If the security countermeasure is set by the setter 71, the setter 71 outputs, to the executor 72, information which represents the security countermeasure which has been set. The executor 72 executes the security countermeasure which has been set by the setter 71 (Step S16).

For example, a cyber-attack is performed to a PC used by the managing system 50 which belongs to the zone Z3, and the PC is infected with a virus. In this case, the virus infection of the PC is detected by the detecting device 60 which belongs to the zone Z3. The setter 71 of the defense device 70 reads this detection result (Step S11), and the setter 71 analyzes it (Step S12). Then, the determination result of Step S13 shown in FIG. 7 is "YES". For this reason, in Step S14, the setter 71 specifies that the PC which belongs to the zone Z3 has been infected with a virus by the cyber-attack (attack target number "A4").

If the target and the type of the cyber-attack have been specified, the setter 71 sets a security countermeasure of logically disconnecting the network port of the network devices NE5 and NE6, based on the countermeasure number "B3" and the target device "NE5, NE6" which are associated with the attack target number "A4" of the fourth line of the setting list LS shown in FIG. 3 (Step S15). Thereafter, the executor 72 executes the security countermeasure which has been set by the setter 71, and the network port of the network devices NE5 and NE6 is disconnected logically (Step S16). By performing the above-described processing, it can be prevented that the PC infected with a virus communicates with devices which belong to other zones (zones Z1 and Z2), and also prevented that the virus infection is expanded.

For example, a cyber-attack is performed to a PC which belongs to the zone Z1. In this case, the cyber-attack to the PC is detected by the detecting device 60 which belongs to the zone Z1. The setter 71 of the defense device 70 reads this detection result (Step S11), and the setter 71 analyzes it (Step S12). Then, the determination result of Step S13 shown in FIG. 7 is "YES". For this reason, in Step S14, the setter 71 specifies that the PC which belongs to the zone Z1 has been received the cyber-attack (attack target number "A8").

If the target and the type of the cyber-attack have been specified, the setter 71 sets a security countermeasure of blocking power supply of the network devices NE1, NE2, and NE3, and for physically blocking the network, based on the countermeasure number "B5" and the target device "NE1, NE2, NE3" which are associated with the attack target number "A8" of the eighth line of the setting list LS shown in FIG. 3 (Step S15). Thereafter, the executor 72 executes the security countermeasure which has been set by the setter 71, the power supply of the network devices NE1, NE2, and NE3 are blocked, and the network is physically blocked in the zone Z1 (Step S16).

By performing the above-described processing, the PC which has been received the cyber-attack and the safety controller 31 which is a core of the safety instrumented system 30 are physically separated from each other in the zone Z1. Thereby, the cyber-attack to the safety controller 31 and the safety instrumented system 30 can be prevented beforehand, and the normality of the safety instrumented system 30 can be secured. For this reason, the role of "stronghold for securing safety" is not lost.

As described above, in the present embodiment, the detecting device 60 which detects cyber-attacks from outside is installed in each of the zones Z1, Z2, and Z3 in which the safety instrumented system 30, the manufacturing system 40, and the managing system 50 are installed respectively. Moreover, based on the detection result of the detecting device 60, the communication between the zones Z1 to Z3 or the communication in the zone Z1 is restricted by the defense device 70. For this reason, the cyber-attack to the safety instrumented system 30 can be prevented beforehand, and the normality of the safety instrumented system 30 can be secured. Further, by setting countermeasures in accordance with threat of the cyber-attack, the cyber-attack can be prevented effectively without shutting down the plant carelessly.

Second Embodiment

Figure 8:
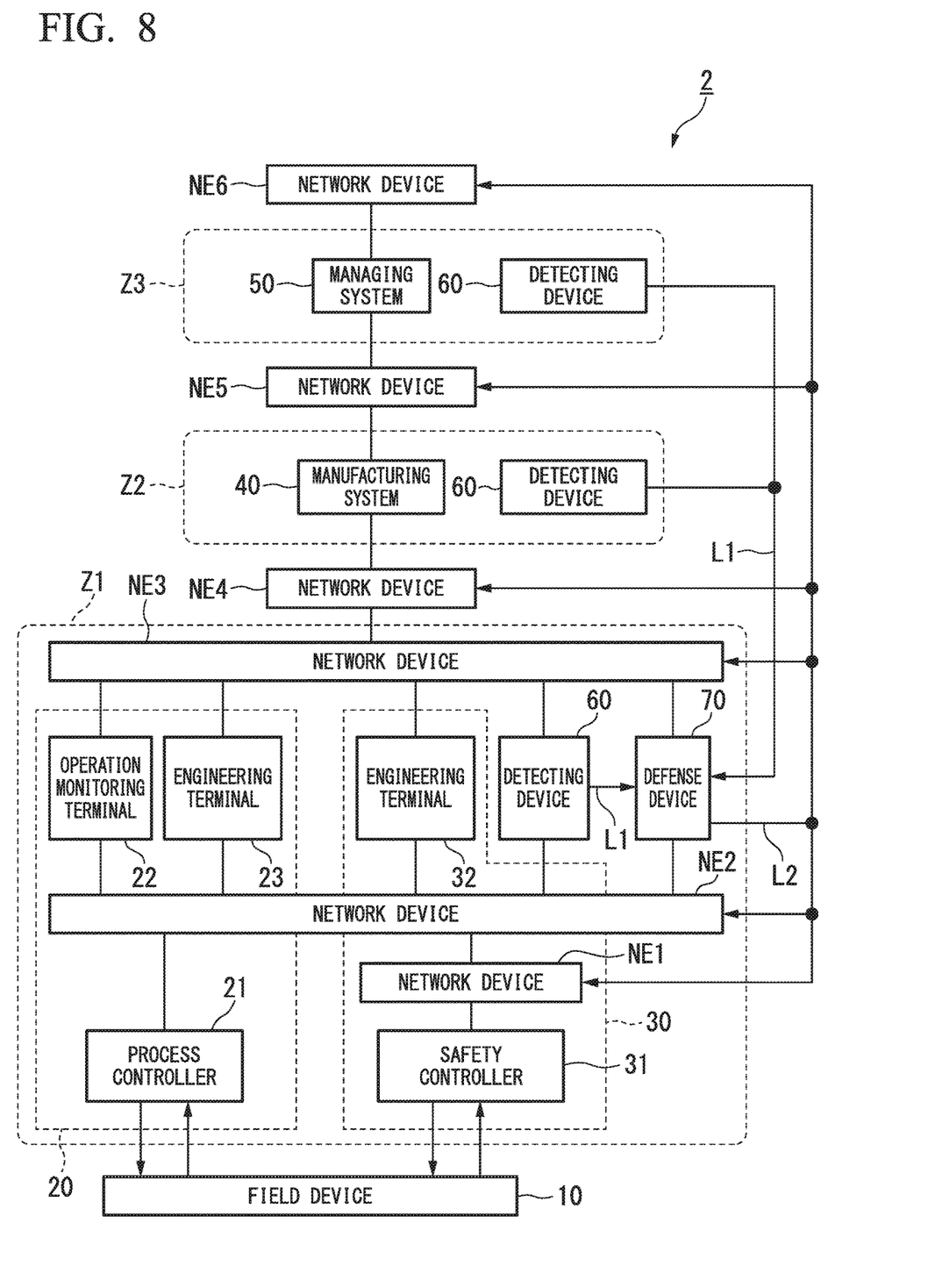
FIG. 8 is a block diagram illustrating a whole configuration of the integrated industrial system in the second embodiment of the present invention.

FIG. 8 is a block diagram illustrating a whole configuration of the integrated industrial system in the second embodiment of the present invention. In FIG. 8, parts that are the same as those in FIG. 1 (or parts that correspond to those in FIG. 1) are assigned the same reference numerals. As shown in FIG. 8, the integrated industrial system 2 of the present embodiment is generally the same configuration as the integrated industrial system 1 shown in FIG. 1. However, the integrated industrial system 2 of the present embodiment is different from the integrated industrial system 1 shown in FIG. 1 in that the detecting device 60 and the defense device 70 are connected to each other through a communication line L1 (first communication line) which is different from the network (the network configured by the network devices NE1 to NE6), and in that the defense device 70 and the network devices NE1 to NE6 are connected through a communication line L2 (second communication line) which is different from the network.

For example, the communication line L1 is a transmission line for transmitting a contact signal, and a transmission line for transmitting an analog signal. The communication line L1 transmits the detection result detected by the detecting device 60 to the defense device 70. The communication line L1 may connect the detecting device 60 and the defense device 70 by one-to-one, or may connect two or more detectors 60 and the defense device 70 in a form of network.

For example, similar to the communication line L1, the communication line L2 is a transmission line for transmitting a contact signal, and a transmission line for transmitting an analog signal. The communication line L2 transmits, to the network devices NE1 to NE6, a signal transmitted from the defense device 70 (a signal for performing security countermeasures). Similar to the communication line L1, the communication line L2 may connect the defense device 70 and the network devices NE1 to NE6 by one-to-one, or may connect the defense device 70 and the network devices NE1 to NE6 in a form of network.

In this way, the detecting device 60 and the defense device 70 are connected by the communication line L1, and the defense device 70 and the network devices NE1 to NE6 are connected by the communication line L2, in order to be able to prevent the cyber-attack from outside more certainly. That is, if a cyber-attack is performed, there is a possibility that communication through the network configured by the network devices NE1 to NE6 becomes impossible. Even if the communication through the network becomes impossible, in a case that the communication through the communication line L1 and the communication line L2 is possible, the detection result of the detecting device 60 can be transmitted to the defense device 70, and the security countermeasures (for example, a countermeasure of restricting a communication between the zones Z1 to Z3, or a countermeasure of restricting a communication in the zone Z1) can be performed by the defense device 70. For this reason, the cyber-attack from outside can be prevented more certainly.

The integrated industrial system 2 of the present embodiment is the same as the integrated industrial system 1 of the first embodiment, except that the detection result of the detecting device 60 is transmitted to the defense device 70 through the communication line L1, and except that the signal from the defense device 70 (signal for performing a security countermeasure) is transmitted to the network devices NE1 to NE6 through the communication line L2. For this reason, since operations of the integrated industrial system 2 of the present embodiment are basically the same as those of the integrated industrial system 1 of the first embodiment, detail explanations will be omitted.

As described above, also in the present embodiment, similar to the first embodiment, the detecting device 60 which detects cyber-attacks from outside is installed in each of the zones Z1, Z2, and Z3 in which the safety instrumented system 30, the manufacturing system 40, and the managing system 50 are installed respectively. Moreover, based on the detection result of the detecting device 60, the communication between the zones Z1 to Z3 or the communication in the zone Z1 is restricted by the defense device 70. For this reason, the cyber-attack to the safety instrumented system 30 can be prevented beforehand, and the normality of the safety instrumented system 30 can be secured. Further, by setting countermeasures in accordance with threat of the cyber-attack, the cyber-attack can be prevented effectively without shutting down the plant carelessly.

Third Embodiment

Figure 9:
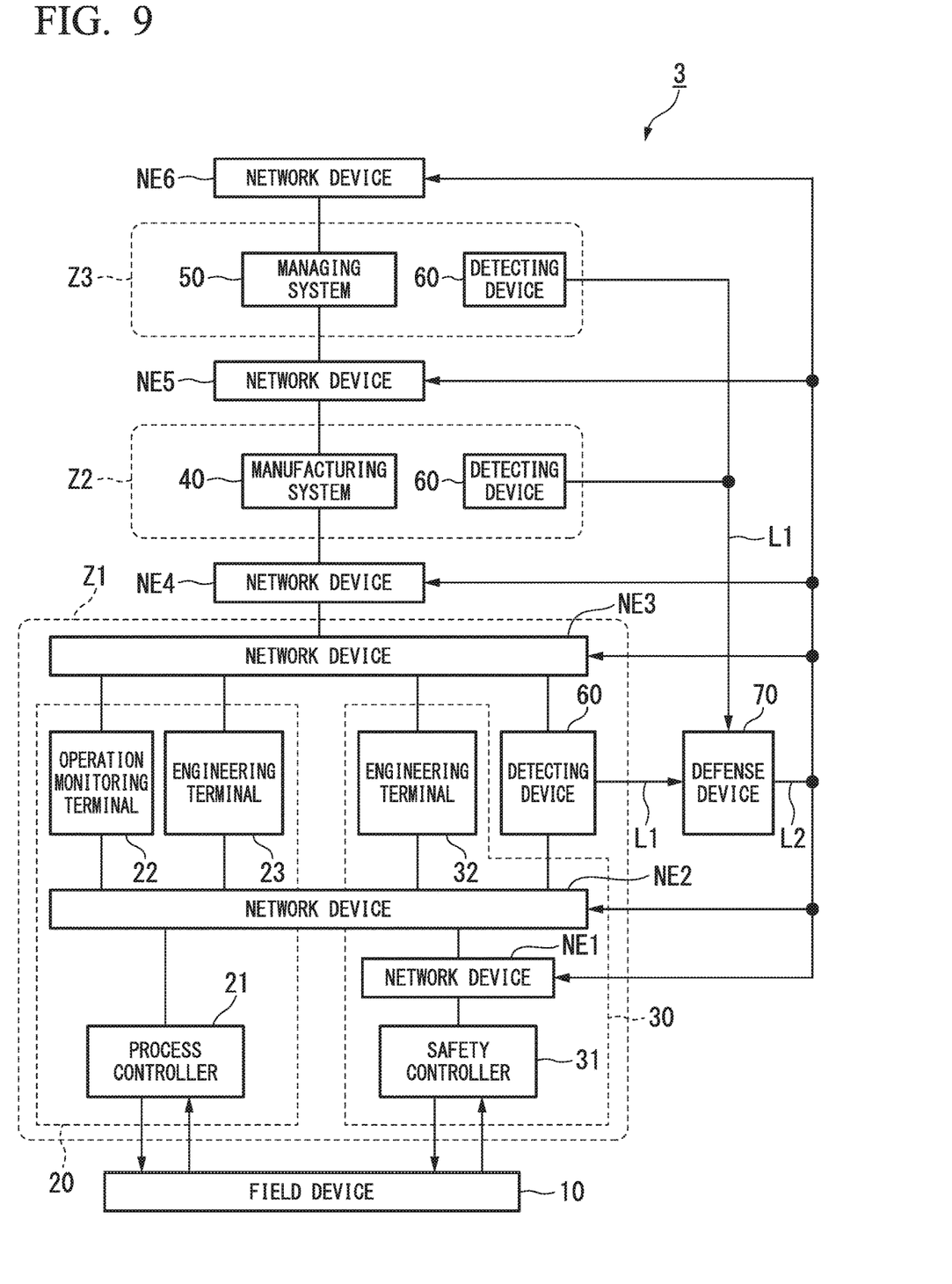
FIG. 9 is a block diagram illustrating a whole configuration of the integrated industrial system in the third embodiment of the present invention.

FIG. 9 is a block diagram illustrating a whole configuration of the integrated industrial system in the third embodiment of the present invention. In FIG. 9, parts that are the same as those in FIG. 1 and FIG. 8 (or parts that correspond to those in FIG. 1 and FIG. 8) are assigned the same reference numerals. As shown in FIG. 9, the integrated industrial system 3 of the present embodiment is generally the same configuration as the integrated industrial system 2 shown in FIG. 8. However, the integrated industrial system 3 of the present embodiment is different from the integrated industrial system 2 shown in FIG. 8 in that the defense device 70 is installed in neither of the zones Z1 to Z3 (the defense device 70 belongs to neither of the zones Z1 to Z3).

If the defense device 70 is installed in the zone Z1 in which the safety instrumented system 30 is installed like the integrated industrial system 2 shown in FIG. 8, the safety instrumented system 30 which plays a role of "stronghold for securing safety" and the defense device 70 which defends the safety instrumented system 30 can be constructed integrally. On the other hand, in the integrated industrial system 3 of the present embodiment, the safety instrumented system 30 and the defense device 70 can be constructed separately, and the flexibility of the construction can be improved.

In the present embodiment, similar to the first and second embodiments, the detecting device 60 which detects cyber-attacks from outside is installed in each of the zones Z1, Z2, and Z3 in which the safety instrumented system 30, the manufacturing system 40, and the managing system 50 are installed respectively. Moreover, based on the detection result of the detecting device 60, the communication between the zones Z1 to Z3 or the communication in the zone Z1 is restricted by the defense device 70. For this reason, the cyber-attack to the safety instrumented system 30 can be prevented beforehand, and the normality of the safety instrumented system 30 can be secured. Further, by setting countermeasures in accordance with threat of the cyber-attack, the cyber-attack can be prevented effectively without shutting down the plant carelessly.

In the present embodiment, similar to the second embodiment, the detecting device 60 and the defense device 70 are connected by the communication line L1, and the defense device 70 and the network devices NE1 to NE6 are connected by the communication line L2. For this reason, even if communication through the network configured by the network devices NE1 to NE6 becomes impossible, the detection result of the detecting device 60 can be transmitted to the defense device 70, and security countermeasures can be performed by the defense device 70. For this reason, the cyber-attack from outside can be prevented more certainly.

OTHER EMBODIMENTS

Figure 10A:
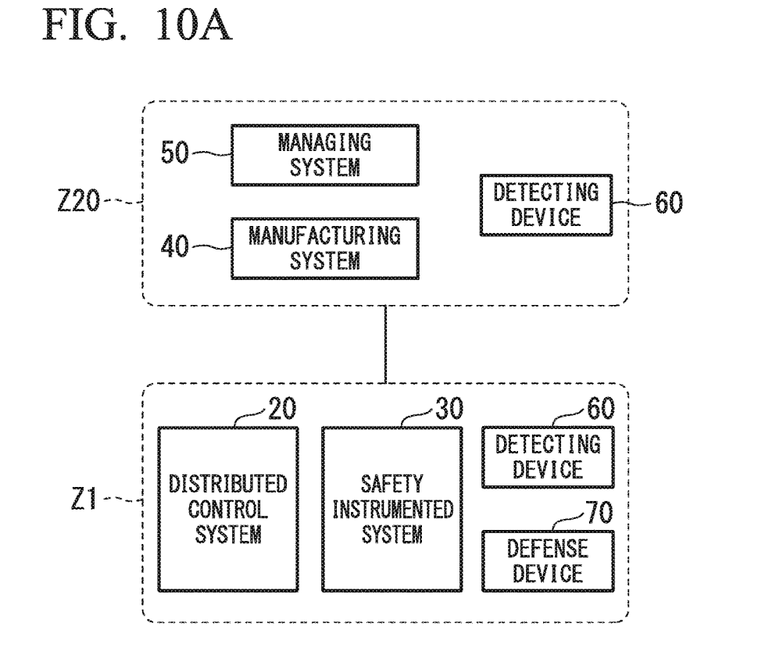
FIG. 10A is a block diagram illustrating the integrated industrial system in the other embodiments of the present invention.
Figure 10B:
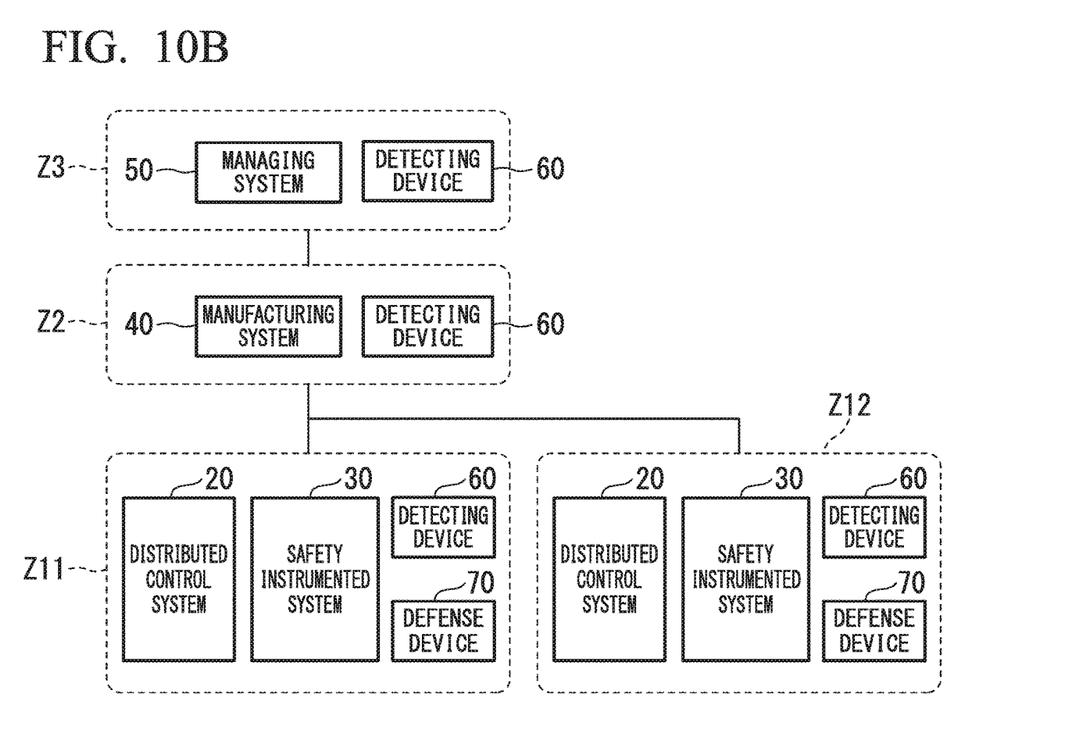
FIG. 10B is a block diagram illustrating the integrated industrial system in the other embodiments of the present invention.

FIG. 10A and FIG. 10B are block diagrams illustrating the integrated industrial system in the other embodiments of the present invention. In FIGS. 10A and 10B, parts that are the same as those in FIG. 1, FIG. 8, and FIG. 9 (or parts that correspond to those in FIG. 1, FIG. 8, and FIG. 9) are assigned the same reference numerals. In FIG. 10A and FIG. 10B, the field device 10 and the network devices NE1 to NE6 are omitted to simplify the illustration.

In the integrated industrial system of the embodiment shown in FIG. 10A, the manufacturing system 40 and the managing system 50 are installed in the same zone Z20, and the detecting device 60 is installed in the zone Z20. Although the integrated industrial systems 1 to 3 of the first to third embodiments are sectioned to the zones Z1 to Z3 on a basis of hierarchy, two or more hierarchies may be installed in one zone as the present embodiment.

The integrated industrial system of the embodiment shown in FIG. 10B is equipped with two or more distributed control systems 20 and two or more safety instrumented systems 30. In the integrated industrial system of this form, the distributed control system 20, the safety instrumented system 30, the detecting device 60, and the defense device 70 are installed in each of zones Z11 and Z12. In the integrated industrial system shown in FIG. 10B, the safety instrumented system 30 and the defense device 70 are associated with each other, and the defense device 70 operates in order to prevent beforehand the cyber-attack to the associated safety instrumented system 30.

In the second embodiment described above, although the defense device 70 is installed in the zone Z1 in which the safety instrumented system 30 is installed, it is not necessary for the defense device 70 to be installed in the zone Z1. For example, the defense device 70 may be installed in a zone (the zone Z2 or the zone Z3) which is different from the zone Z1 in which the safety instrumented system 30 is installed.

Although an integrated industrial system and a control method thereof according to embodiments of the present invention have been described above, the present invention is not restricted to the above-described embodiments, and can be freely modified within the scope thereof. For example, the foregoing descriptions of the embodiments have been examples in which the integrated industrial system is sectioned to the zones Z1 to Z3 on a basis of hierarchy specified by International Standard ISA-95 (IEC/ISO 62264), in order to secure security. However, it is not necessary for the integrated industrial system to be configured in conformity with the standard. As shown in the examples of FIG. 10A and FIG. 10B, a zone for security countermeasures can be set arbitrarily, and a zone in which a configuration included in the integrated industrial system is installed can be set arbitrarily.

In the embodiment described above, in order to understand easily, an example of defending the cyber-attack to the safety instrumented system 30 has been described. However, in addition to the safety instrumented system 30, security countermeasures may be performed in consideration of an influence on the distributed control system 20.

As used herein, the following directional terms "front, back, above, downward, right, left, vertical, horizontal, below, transverse, row and column" as well as any other similar directional terms refer to those instructions of a device equipped with the present invention. Accordingly, these terms, as utilized to describe the present invention should be interpreted relative to a device equipped with the present invention.

The term "configured" is used to describe a component, unit or part of a device includes hardware and/or software that is constructed and/or programmed to carry out the desired function.

Moreover, terms that are expressed as "means-plus function" in the claims should include any structure that can be utilized to carry out the function of that part of the present invention.

The term "unit" is used to describe a component, unit or part of a hardware and/or software that is constructed and/or programmed to carry out the desired function. Typical examples of the hardware may include, but are not limited to, a device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. An integrated industrial system for a plant having a plurality of zones comprising:
   a safety instrumented system which is installed in a first zone and configured to certainly shut down the plant in a safe state in an emergency;
   a manufacturing system which is connected to the safety instrumented system through a network, the manufacturing system being installed in a second zone which is different from the first zone, the manufacturing system being established for manufacturing products in the plant efficiently;
   a first detector which is installed in the first zone, the first detector being configured to detect a first cyber-attack from outside of the integrated industrial system to the first zone;
   a second detector which is installed in the second zone, the second detector being configured to detect a second cyber-attack from outside of the integrated industrial system to the second zone; and
   a defender configured to perform a countermeasure of restricting a communication between the first zone and the second zone or of restricting a communication in the first zone or the second zone, based on a detection result of at least one of the first detector and the second detector,
   wherein the defender performs a first countermeasure of blocking power supply of a network device installed in the first zone to block the network physically in a case where the first detector detects the first cyber-attack from outside of the integrated industrial system to the first zone,
   wherein the defender performs a second countermeasure in a case where the second detector detects the second cyber-attack from outside of the integrated industrial system to the second zone, and
   wherein the first countermeasure protects the first zone from the first cyber-attack more securely than the second countermeasure.

2. The integrated industrial system according to claim 1, wherein the defender further comprises:
   a setter configured to specify a target and a type of the first cyber-attack based on the detection result of the first detector and the detection result of the second detector, the setter being configured to set the countermeasure in accordance with the target and the type which have been specified; and
   an executer configured to execute the countermeasure which has been set by the setter.

3. The integrated industrial system according to claim 2, wherein the setter is configured to set the countermeasure by using a setting list in which the target and the type of the first cyber-attack are associated with the countermeasure which should be performed in accordance with the target and the type of the first cyber-attack.

4. The integrated industrial system according to claim 1, wherein the defender is installed in the first zone in which the safety instrumented system is installed,
   wherein the defender is configured to obtain the detection result of the first detector and the detection result of the second detector through the network, and
   wherein the defender is configured to perform the countermeasure through the network.

5. The integrated industrial system according to claim 1, wherein the defender is configured to obtain the detection result of the first detector and the detection result of the second detector through a first communication line which is different from the network, and
   wherein the defender is configured to perform the countermeasure through a second communication line which is different from the network.

6. The integrated industrial system according to claim 5, wherein the defender is installed in the first zone, or in neither the first zone nor the second zone but in another of the plurality zones.

7. The integrated industrial system according to claim 1, wherein the manufacturing system is a first system which includes at least one of a manufacturing execution system, a plant information management system, and a plant asset management system.

8. The integrated industrial system according to claim 7, further comprising:
   a second system which is installed in a third zone which is different from the second zone in which the first system is installed, the second system comprising an enterprise resource planning system.

9. The integrated industrial system according to claim 1, further comprising:
   a distributed control system which is installed in the first zone in which the safety instrumented system is installed, the distributed control system being configured to control industrial process implemented in a plant.

10. The integrated industrial system according to claim 9, wherein the integrated industrial system is sectioned into two or more zones, and
    wherein each of the two or more zones includes the distributed control system, the safety instrumented system, one of the first detector and the second detector, and the defender.

11. An integrated industrial system for a plant having a plurality of zones comprising:
    a first zone which comprises:
       a safety instrumented system for ensuring safety in operation of the plant, the safety instrumented system being configured to certainly shut down the plant in a safe state in an emergency; and
       a first detector configured to detect a first cyber-attack from outside of the integrated industrial system to the first zone;
    a second zone which comprises:
       a manufacturing system which is connected to the safety instrumented system through a network, the manufacturing system being established for manufacturing products in the plant efficiently; and
       a second detector configured to detect a second cyber-attack from outside of the integrated industrial system to the second zone; and
    a defender configured to restrict a communication between the first zone and the second zone or restrict a communication in the first zone or the second zone, based on a detection result of at least one of the first detector and the second detector,
wherein the defender performs a first countermeasure of blocking power supply of a network device installed in the first zone to block the network physically in a case where the first detector detects the first cyber-attack from outside of the integrated industrial system to the first zone,
wherein the defender performs a second countermeasure in a case where the second detector detects the second cyber-attack from outside of the integrated industrial system to the second zone, and
wherein the first countermeasure protects the first zone from the first cyber-attack more securely than the second countermeasure.

12. The integrated industrial system according to claim 11,
wherein the defender further comprises:
a setter configured to specify a target and a type of the first cyber-attack based on the detection result of the first detector and the second detector, the setter being configured to set a countermeasure in accordance with the target and the type which have been specified; and
an executer configured to execute the countermeasure which has been set by the setter.

13. The integrated industrial system according to claim 12,
wherein the setter is configured to set the countermeasure by using a setting list in which the target and the type of the first cyber-attack are associated with the countermeasure which should be performed in accordance with the target and the type of the first cyber-attack.

14. The integrated industrial system according to claim 11,
wherein the defender is installed in the first zone in which the safety instrumented system is installed,
wherein the defender is configured to obtain the detection result of the first detector and the second detector through the network, and
wherein the defender is configured to perform the countermeasure through the network.

15. The integrated industrial system according to claim 11,
wherein the defender is configured to obtain the detection result of the first detector and the second detector through a first communication line which is different from the network, and
wherein the defender is configured to perform the countermeasure through a second communication line which is different from the network.

16. The integrated industrial system according to claim 15,
wherein the defender is installed in the first zone, or in neither the first zone nor the second zone but in another of the plurality of zones.

17. The integrated industrial system according to claim 11,
wherein the manufacturing system is a first system which includes at least one of a manufacturing execution system, a plant information management system, and a plant asset management system.

18. The integrated industrial system according to claim 17, further comprising:
a second system which is installed in a third zone which is different from the second zone in which the first system is installed, the second system comprising an enterprise resource planning system.

19. The integrated industrial system according to claim 11, further comprising:
a distributed control system which is installed in the first zone in which the safety instrumented system is installed, the distributed control system being configured to control industrial process implemented in a plant.

20. A control method of an integrated industrial system for a plant having a plurality of zones, which comprises a safety instrumented system which is installed in a first zone and configured to certainly shut down the plant in a safe state in an emergency, and a manufacturing system which is connected to the safety instrumented system through a network, the manufacturing system being installed in a second zone which is different from the first zone, the manufacturing system being established for manufacturing products in the plant efficiently, the control method comprising:
detecting, by a first detector, a first cyber-attack from outside of the integrated industrial system to the first zone, the first detector being installed in the first zone;
detecting, by a second detector, a second cyber-attack from outside of the integrated industrial system to the second zone, the second detector being installed in the second zone;
performing, by a defender, a countermeasure of restricting a communication between the first zone and the second zone or of restricting a communication in the first zone or the second zone, based on a detection result of at least one of the first detector and the second detector,
wherein performing the countermeasure further comprises performing a first countermeasure of blocking power supply of a network device installed in the first zone to block the network physically in a case where the first detector detects the first cyber-attack from outside of the integrated industrial system to the first zone, and performing a second countermeasure in a case where the second detector detects the second cyber-attack from outside of the integrated industrial system to the second zone, and
wherein the first countermeasure protects the first zone from the first cyber-attack more securely than the second countermeasure.

* * * * *